_3,019,877_
_Patented Feb. 6, 1962_

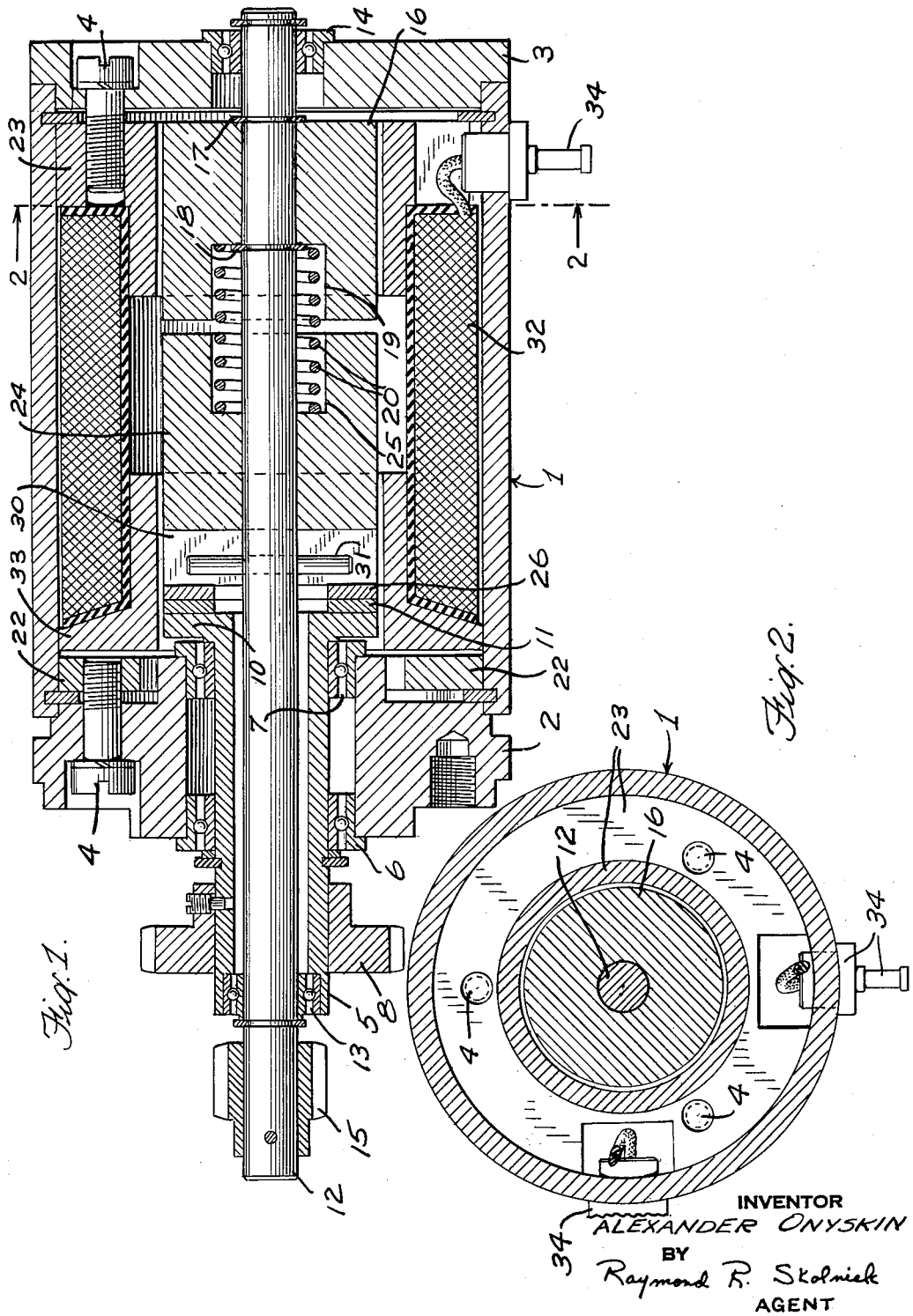

3,019,877
REVERSE ACTING MAGNETIC CLUTCH
Alexander Onyskin, 56 Anoatok Drive, Huntington, N.Y.
Filed July 28, 1959, Ser. No. 830,148
1 Claim. (Cl. 192—90)

The invention relates in general to magnetic clutches and more particularly to reverse acting miniature magnetic clutches.

In reverse acting magnetic clutches it is customary to make use of a spacer between the couplings to prevent the couplings from coming in contact with one another whenever the clutch is engaged. The distance which has to be maintained between the couplings is extremely critical since too small a space will allow the slide coupling to come too close to the stationary coupling resulting in a bound main shaft. If too large a space is allowed between the couplings the flux path generated through the couplings may be impeded by the air gap and prevent the operation of the declutching device. In addition the large air gap which has to be maintained in the disengaged position necessitates the use of a large coil, sufficient in size, to energize the couplings and declutch the clutching device.

It is therefore an object of the invention to provide improved means for declutching a magnetic clutch.

Another object of the invention is to provide a clutch in which both couplings rotate with the main shaft.

A still further object of the invention is to provide a clutch where the couplings can contact each other without binding the main shaft.

A still further object of the invention is to provide a clutching mechanism which is small, compact, endurable and economical of manufacture.

To these ends the invention contemplates the use of a shaft having a fixed coupling and a slidable coupling axially aligned therewith. The slide coupling is rotatable with the shaft but slidable thereon and has its face covered with a high friction material. A second shaft concentrically mounted about the first shaft has a high friction material covering one of its ends and in contact with the high friction material of the slide coupling. The friction surfaces of the slide coupling and the second shaft are held in contact by a spring pressure which is exerted by a spring between the two couplings. In this position shaft one and shaft two will rotate together. A coil which is wound about the outside of the two couplings will upon being energized set up a flux path through the two couplings making them magnetic. The slide coupling upon the coil being energized moves towards the fixed coupling breaking the contact between the friction surfaces of the slide coupling and the second shaft, thereby allowing the two shafts to turn independently of each other. Upon the coil being deenergized the spring between the couplings forces them apart and the two friction surfaces come in contact once more locking the two shafts together.

The invention has other objects and advantages which will appear from the following description of a particular embodiment of the invention in conjunction with the accompanying drawing, in which:

FIGURE 1 shows a longitudinal section of a particular embodiment of the invention; and FIGURE 2 shows a cross section of the invention taken along line 2—2 of FIGURE 1.

With reference to FIGURE 1, the particular embodiment shown there of the invention comprises, in general, a circular case 1 having a front bearing cap 2 and a rear bearing cap 3 securely fastened thereto by means of screws 4, front retainer plate 22 and rear retainer plate 23. Mounted within the front bearing cap 2 is a hollow shaft 5 having a flanged rear end 10. The shaft 5 is rotatably supported within the front bearing cap 2 by a pair of bearings 6 and 7. A gear 8 is rigidly secured about the front end of shaft 5 to rotates therewith. A disc 11 which is made of a friction type material is rigidly attached to the flanged end 10 of shaft 5.

A shaft 12 mounted within the hollow shaft 5 and rear bearing cap 3 is rotatably supported within shaft 5 by a bearing 13 and within rear bearing cap 3 by a bearing 14. A gear 15 is rigidly secured about the front end of shaft 12 to rotate therewith.

A coupling 16 is mounted about shaft 12 at the rear end thereof and within rear retainer plate 23, and is held in an axially fixed relationship with shaft 12 by means of snap rings 17 and 18. The coupling 16 has a counterbored hole 19 in its front end to retain the rear part of a spring 20 therein. A slide coupling 24 is slidably mounted about shaft 12. Coupling 24 has a counterbored hole 25 in its rear end to retain the front part of the spring 20 therein. Rigidly attached to the front end of the coupling 24 is a disc 26 which is made of a friction type material. The disc 26 is normally held in contact with the disc 11 by means of the pressure applied by spring 20 through slide coupling 24. At the front end of the coupling 24 is a slot 30. Within the slot 30 is a pin 31 which is rigidly affixed to shaft 12.

A coil 32 mounted within the case 1 is held by rear retainer plate 23 and a front retainer 33 and has a voltage impressed therein through terminals 34.

In the normal mode of operation the shaft 12 and the hollow shaft 5 will rotate together in the same direction. When the shaft 12 is rotated by means of gear 15 or other similar means and the coil 32 has no signal or voltage applied thereto the pin 31 rotating with shaft 12 will in turn rotate slide coupling 24. Slide coupling 24 due to the spring pressure being exerted by spring 20 will be holding the disc 26 in engagement with disc 11. Because of the high friction material of which disc 26 and disc 11 are formed shaft 5 will be forced to rotate with the rotation of slide coupling 24. Therefore, it can readily be seen that with no signal applied to the coil 32 shaft 12 and hollow shaft 5 will rotate together in the same direction.

When a signal or voltage is applied to coil 32 a flux path is created through the coil 32, slide coupling 24, fixed coupling 16 and back to coil 32. Since the slide coupling 24 and fixed coupling 16 are made of a material which becomes magnetic upon a current being passed therein the slide coupling 24 will be attracted to the fixed coupling 16 and attach itself thereto. Although the rotation of shaft 12 will rotate the slide coupling 24 due to the pin 31 rotating with the shaft 12, the hollow shaft 5 will not rotate therewith because the disc 26 affixed to slide coupling 24 has been disengaged from disc 11. It is possible that coupling 16 will rotate with the slide coupling 24 when the above conditions prevail but this is permissible since the coupling 16 is not locked to the case or ground. The shaft 5 is now free to rotate in any direction or to remain stationary.

Upon the signal or voltage being removed the magnetic attraction between the slide coupling 24 and coupling 16 is broken. The spring 20 exerts sufficient spring pressure to force the slide coupling 24 away from the coupling 16 and towards the shaft 5. Once the disc 26 engages the disc 11 shaft 5 will rotate with shaft 12 at the same speed and in the same direction.

In reverse acting magnetic clutches of the character described it has been customary to make the rear retainer plate 23 and the coupling 16 as one piece. By so doing it became necessary to provide a device which would keep the slide coupling 24 from coming into engagement with coupling 15 in order to prevent the shaft 12 from becoming locked to the case 1. The air gap that had to be provided between the couplings was extremely difficult to maintain and costly to provide. The present invention provides a new and novel means for overcoming the objections to the prior art.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

A miniature magnetic clutch comprising a tubular case having a front bearing cap secured at the front end of said case and a rear bearing cap secured at the rear end of said case, a hollow shaft rotatably secured within said front bearing cap and having an annular flange at the rear end thereof and being secured against axial movement with respect to said tubular case, a second shaft rotatably supported within said hollow shaft and secured to said rear bearing cap and secured against axial movement with respect to said tubular case, a first coupling of magnetic material secured to said second shaft and being concentric therewith, a second coupling of magnetic material mounted on said shaft and being concentric therewith and axially movable with respect thereto, said second coupling having a slot in one face thereof, a pin extending from said second shaft, said pin being received in said slot whereby said second coupling rotates with said second shaft, said slotted face of said second coupling being adjacent to said annular flange and being movable into engagement therewith, a spring biasing means interposed between said first and second coupling toward engagement with said annular flange and away from said first coupling, the interfaces between said first and second couplings defining an air gap, and an energizing winding secured to said casing and concentric with said first and second couplings, energization of said energizing winding generating a magnetic flux through said first coupling, said air gap and said second coupling to cause said second coupling to move toward said first coupling against the force of said biasing spring whereby said second coupling disengages said annular flange.

References Cited in the file of this patent

UNITED STATES PATENTS

| | | |
|---|---|---|
| 1,953,179 | Kingston | Apr. 3, 1934 |
| 2,514,385 | Garbarini et al. | July 11, 1950 |
| 2,803,323 | Newell | Aug. 20, 1957 |
| 2,859,845 | Bachman | Nov. 11, 1958 |
| 2,976,976 | Parker | Mar. 28, 1961 |